(12) United States Patent
Breunese (10) Patent No.: US 7,076,779 B2
(45) Date of Patent: Jul. 11, 2006

(54) SYSTEM FOR CONTROLLING AND MONITORING A PROCESS

(75) Inventor: Arno Pieter Jan Breunese, Venlo (NL)

(73) Assignee: OCE Technologies B.V., Venlo (NL)

( * ) Notice: Subject to any disclaimer, the term of this patent is extended or adjusted under 35 U.S.C. 154(b) by 604 days.

(21) Appl. No.: 10/198,158

(22) Filed: Jul. 19, 2002

(65) Prior Publication Data

US 2003/0018402 A1 Jan. 23, 2003

(30) Foreign Application Priority Data

Jul. 19, 2001 (EP) ................................ 01202761

(51) Int. Cl.
 *G06F 9/46* (2006.01)
(52) U.S. Cl. ............... 718/100; 718/102; 718/107; 709/203; 709/223; 709/224
(58) Field of Classification Search ............... 718/100, 718/102, 107; 709/201, 203, 223, 224, 226; 714/25; 707/10, 102
See application file for complete search history.

(56) References Cited

U.S. PATENT DOCUMENTS

| | | | | |
|---|---|---|---|---|
| 5,195,178 | A * | 3/1993 | Krieger et al. | 715/809 |
| 5,249,300 | A * | 9/1993 | Bachman et al. | 707/104.1 |
| 5,878,431 | A * | 3/1999 | Potterveld et al. | 707/103 R |
| 6,615,166 | B1 * | 9/2003 | Guheen et al. | 703/27 |
| 6,636,242 | B1 * | 10/2003 | Bowman-Amuah | 715/764 |
| 6,640,238 | B1 * | 10/2003 | Bowman-Amuah | 709/201 |
| 6,662,357 | B1 * | 12/2003 | Bowman-Amuah | 717/120 |
| 6,789,054 | B1 * | 9/2004 | Makhlouf | 703/6 |
| 6,813,587 | B1 * | 11/2004 | McIntyre et al. | 702/183 |
| 6,920,495 | B1 * | 7/2005 | Fuselier et al. | 709/224 |

FOREIGN PATENT DOCUMENTS

| EP | 0838773 A1 | 4/1998 |
|---|---|---|
| EP | 0903678 A2 | 3/1999 |

OTHER PUBLICATIONS

Object-Oriented Analysis and Design With Application, Grady Booch, second edition, Addison-Wesley Publishing Company, Copyright 1994.*

(Continued)

*Primary Examiner*—Majid Banankhah
(74) *Attorney, Agent, or Firm*—Birch, Stewart, Kolasch & Birch, LLP (57) ABSTRACT

A system for controlling and monitoring a process performed by one or more actors characterized by roles, is provided. The process is associated with a complex object, e.g. a document, in which constituent objects, e.g. chapters, can be distinguished. The system defines and stores models of the complex object and of the process, wherein the process includes actions. The system creates action-object combinations for linking roles to actions, for establishing whether an action-object combination is ready to be executed, and makes executable action-object combinations available to actors with the appropriate role. The system models the complex object in a hierarchical multi-layered tree structure of constituent objects, in which parent objects have children in a lower layer. A programmable processing device comprises one or more of the components of the system. A computer program, when run on a computer, turns the computer into such a programmable processing device.

28 Claims, 4 Drawing Sheets

OTHER PUBLICATIONS

Sarin "Object-oriented workflow technology in InConcert", IEEE Comput. Soc. Press, pp. 446-450 (Feb. 1996).

Erens, et al "Product Modelling Using Multiple Levels of Abstraction Instances Astypes", Computers in Industry, vol. 24, No. 1, pp. 17-28, (Nov. 8, 1993).

Marshak "IBM's Flowmark Object-Oriented Workflow for Mission-Critical Applications", workgroup computing report, vol. 17, No. 5, pp. 3-13 (May 1994).

Sarin et al "A Process Model and System for Supporting Collaborative Work", SIGOIS bulletin, 2 2/3 pp. 213-224 (1991).

* cited by examiner

SYSTEM FOR CONTROLLING AND MONITORING A PROCESS

The present application claims, under 35 U.S.C. § 119, the benefit of European Patent Application No. 01202761.1 filed Jul. 19, 2001, the entire contents of which are herein fully incorporated by reference.

BACKGROUND OF THE INVENTION

1. Field of the Invention

The invention relates to a system for controlling and monitoring a process performed by one or more actors defined by roles, wherein the process is associated with a complex object, e.g., a document, in which constituent objects, e.g., chapters, can be distinguished.

2. Discussion of the Related Art

A system for monitoring a process according to a related art is known from Sarin et al., "A Process Model and System for Supporting Collaborative Work", SIGOIS bulletin, Feb. 2/3, 1991, p. 213–224. This system supports the definition, execution, monitoring, and dynamic modification of organizational processes, and is implemented as an object-oriented network service.

The known system above can only process a complex object by dividing it into many small objects. Choosing an appropriate granularity is left to the user. Sarin suggests decomposing the complex object into as many smaller objects as possible, to increase the fineness of concurrency. This would, however, impose a burden on the system, as it would have to maintain state information about many small objects.

SUMMARY OF THE INVENTION

Accordingly, it is an object of the invention to provide a system wherein complex objects can be processed in an effective and efficient way.

It is another object of the invention to provide a system for controlling and monitoring a process, which overcomes problems and limitations associated with the related art.

Accordingly, the system according to an embodiment of the invention is characterized in that the complex object is modeled in a hierarchical multi-layered tree structure of constituent objects, in which parent objects have children in a lower layer.

Thus, not only is the process model decomposed into actions, but the complex object is also decomposed in an intelligent way into constituent objects, which are combined with the actions. The system according to the invention therefore allows actions on parts of the complex object to be performed simultaneously instead of sequentially, leading to a more efficient use of available resources.

In a preferred embodiment of the system according to the invention, the complex object and its constituent objects have attributes, and the system comprises at least one component for automatically changing the attributes of all child and parent objects of an object, when an attribute of the object affecting the attributes of the child and parent objects is changed in an action performed on the object. Thus, a change in the attributes of one object automatically leads to a propagation of attribute changes through the hierarchical multi-layered tree structure, for example when actions on all the constituent objects of a composite object have been completed.

A system according to a related art requires the user to assign actions to objects, thus creating a task in a process. Although templates can be used, creation of an active job requires associating appropriate objects with the job where object names have been defined but not bound in the job template.

In contrast, the invention provides a system wherein the unit for defining the process requires little effort on the part of the user of the system. In the system according to the invention, the complex object and its constituent objects have an object type, and the unit for defining a process model comprises a unit for associating an object type with an action.

Thus, due to this object-centred approach of the present invention, a user need only define the object model and process model. The present system will automatically link the objects in the object model to the appropriate tasks. Both object model and process model can be used again, saving the user time and effort.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained in further detail with reference to the attached drawings of which:

FIG. 4 schematically shows an example of an abstract model of a process, appropriate for use with the object model of FIG. 2 in the system of FIG. 1, FIG. 5 schematically shows an example of a database, usable in the invention, for defining and storing an abstract model of the process, and FIG. 6 schematically shows an example of a flow chart describing various phases, which the system according to the invention can go through.

DETAILED DESCRIPTION OF THE PREFERRED EMBODIMENTS

Figure 1:
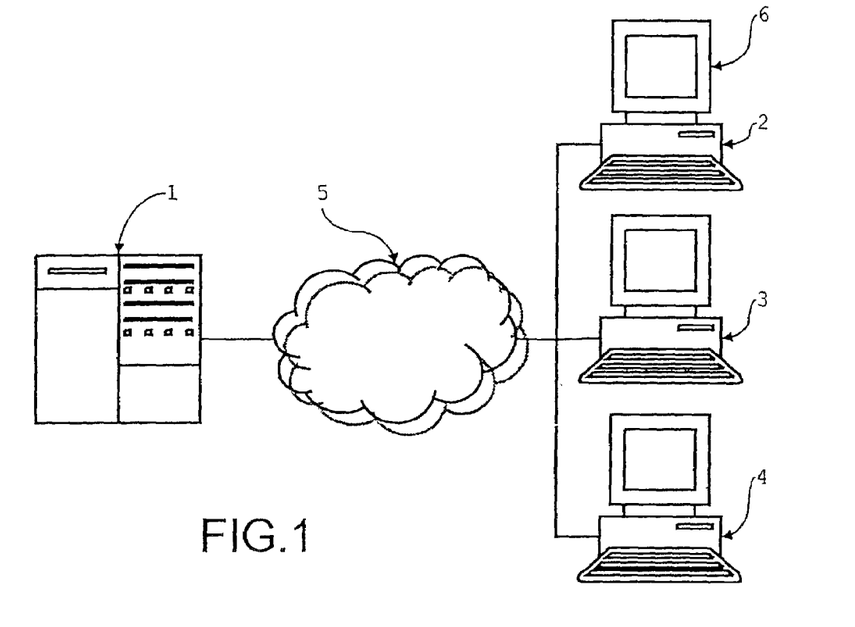
FIG. 1 schematically shows an example of a system for controlling and monitoring a process according to the invention, as it is used to create a document, e.g., a product manual, FIG. 2 schematically shows an example of a model of a product manual, for use in the system of FIG. 1, FIG. 3 schematically shows an example of a database for defining and storing a model of the complex object in an embodiment of the system according to the invention.

FIG. 1 schematically shows a system for controlling and monitoring a process according to an embodiment of the invention, usable to control and monitor the creation of a document, for example, a product manual. The system comprises a server 1 and three computers 2–4, which are interconnected through a network 5. Each computer 2–4 comprises a monitor 6 and the usual other components, such as a processor, keyboard, mouse, storage medium, etc. The network 5 might be a LAN (local area network), a company's intranet, the internet, or any other known communications network. It is not essential to the invention that there be three computers 2–4 or that the system comprises a server 1. Processes on the server 1 could be carried out on one or more of the computers 2–4. The whole configuration is provided purely as an example.

Nevertheless, the configuration with the computers 2–4 connected to the server 1 through the network 5 does provide several advantages. In a preferred embodiment of the system according to the present invention, information pertaining to the object(s) and the process is stored in databases in the server 1. Information about the progress of the process can then be accessed at all times using one of the computers 2–4. If the process is the creation of an electronic document, one copy, accessible by each computer user, can be kept in the server 1. A preferred embodiment of the system makes use of web-technology to provide the users of the computers 2–4 with access to the system. Tasks and/or information can be sent to the users by e-mail, or the users can retrieve the information they need using a browser.

In another embodiment of the system, several other computer programs are integrated into the system according to the present invention. It is useful to integrate word processors if the process monitored by the system is the creation of an electronic document, for example.

The users of the computers 2–4 each play one or more specific roles in the creation of the document, according to their particular skills and resources. For example, the user of the first computer 2 might be a manager overseeing the whole process. The user of the second computer 3 might be a technical writer, whereas the user of the third computer 4 might be a development engineer responsible for the development of the product described in the document.

Each of these users or actors is involved at different stages in the process. In a typical large organization they may not be in daily contact with each other, so it is important that a system like that of the invention controls and monitors the progress of the process and the results of the activities of the actors.

The process to be monitored needs to be defined, before the system can be used to control and monitor it. The manager of the process could, for example, enter the definition of the process into the system, using the first computer 2. A definition of a process comprises three main elements: a model of the object involved in the process, an abstract model of the process, and the actors involved in carrying out the process.

Figure 2:
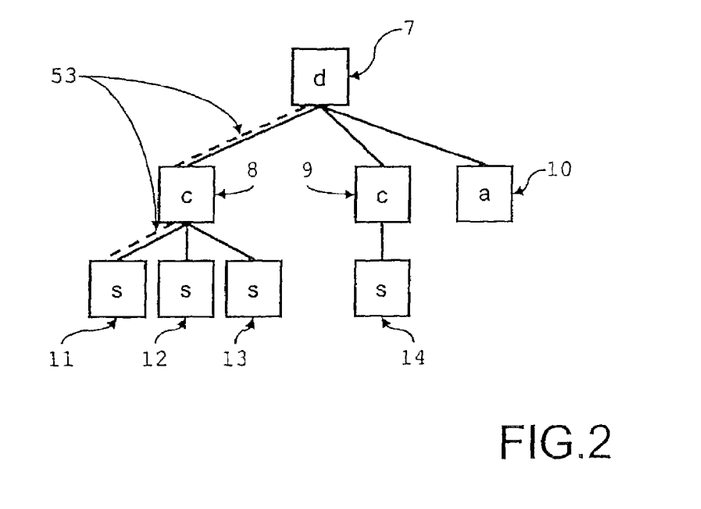

FIG. 2 schematically shows a model of a product manual, as an example of an object model for use in the system of FIG. 1 according to an embodiment of the present invention. The product manual is a composite object, as it includes a number of other objects, such as chapters, sections and appendices. The model of the manual reflects the composite nature of the object by modeling it in a hierarchical multi-layered tree structure, in which parent objects in one layer have child objects in a lower layer.

As shown in FIG. 2, at the top of the structure is a document 7. This represents the entire manual. The document 7 comprises two chapters 8 and 9 and an appendix 10. Chapter one 8 comprises three sections 11, 12 and 13, whereas chapter two 9 comprises one section 14. Of course, a real product manual would have a much more complex structure, with more chapters and sections and maybe with sub-sections, but this example suffices to illustrate the principles of the invention.

Each of the objects 7–14 is an instance of an object type. A type defines a structure common to all objects that are instances of that type. For example, all chapters 8 and 9 are instances of the type 'chapter'. They have the same kinds of attributes and a common set of possible states they can be in. One of the purposes of assigning a type to each object is to define its position in the object model. For example, all chapters 8 and 9 are placed on a level below that of (the document 7, but above that of the sections 11–14. Another purpose of assigning a type is to make it easier to create new objects. A third chapter would merely be another instance of the type 'chapter'. If a third chapter needs to be written, it will automatically receive all the attributes common to the existing chapters 8 and 9, although the attributes will have different values to start with.

Each of the objects 7–14 has certain attributes associated with it and, optionally, in case of a manual for example, information content. The information content of an abstract object, like the document 7, will be quite significant. The information content of one of the sections 11–14 comprises text and illustrations. The information content can be stored in the system, for example, in the server 1. In this way, the actors can access the content through their computer 2–4, when they need to modify the information content during the process.

The attributes define the state of an object. Attributes defining the state of an object could for instance be used to indicate whether an object is currently being processed, whether it is finished, or whether work on it has yet to be started. Other attributes will bear a relation to the process, in which the object is involved, for example, indicating whether the illustrations have been included in the chapter, whether it has been checked for errors, etc.

Figure 3:
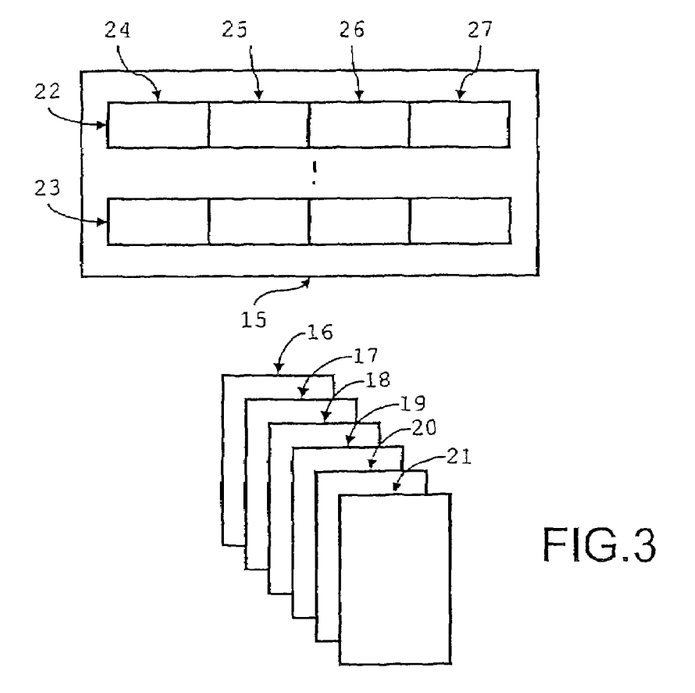

The system according to the invention uses a database to define and store the model of the document 7. FIG. 3 shows an example of an object model database 15 usable in the system of the present invention. As shown in FIG. 3, content files 16–21 are used to store the information content of the document 7. The object model database 15 contains records 22–23, one for each object in the model of the document 7.

A record comprises a plurality of fields 24–27 defining the characteristics of each object. One of these fields 24–27 is an identifier field 24 unique to the object. Another field will be a type field 25 defining the object's type. An inheritance field 26 describes the object's relation to other objects and comprises rules for updating shared attributes. For example, the contents of the inheritance field 26 in the record for chapter one 8 will indicate that it is the parent of sections one to three 11–13, that it is the child of the document 7, and that the information content of chapter one 8 is the aggregate of the contents of sections one to three 11–13. It is a real advantage of the invention that it is not necessary to store multiple copies of the information content of each object. The record for chapter one 8 will contain pointers to content files 16–21, which contain the contents of the three sections. The record defining section one 11 of chapter one 8 will contain a pointer to only one content file 16. An attribute field 27 defines and stores the object's attributes defining its state.

Figure 4:
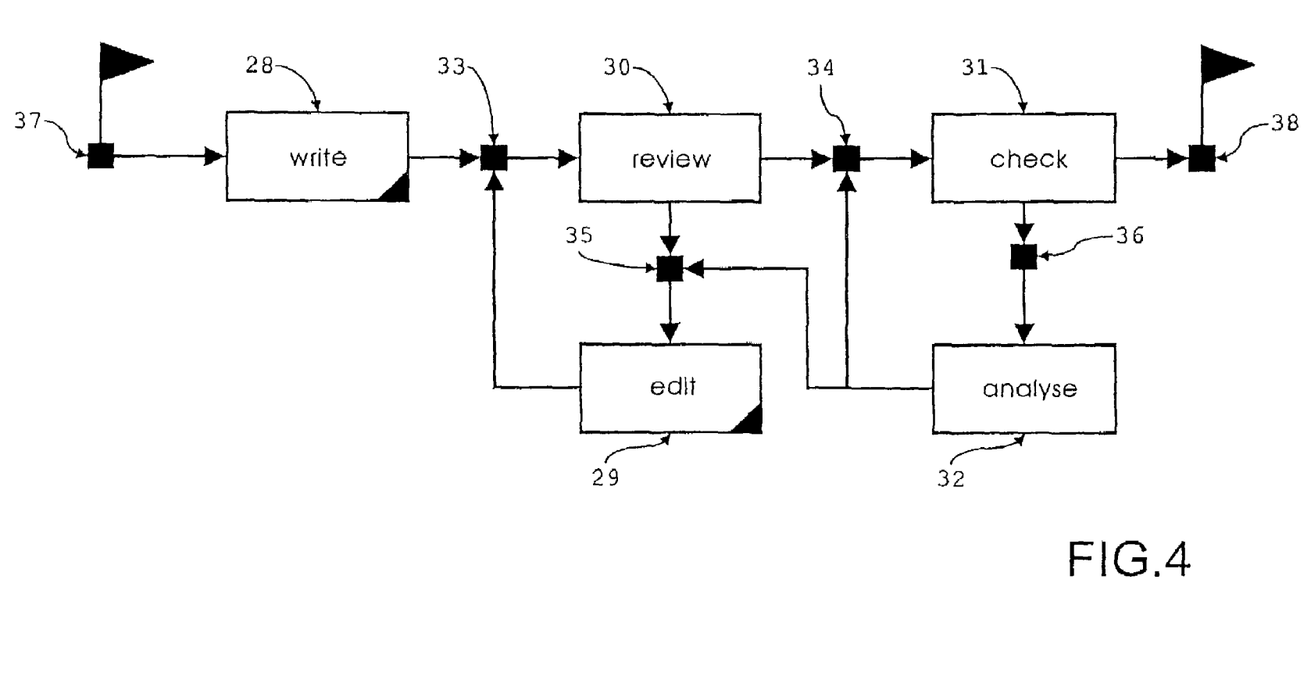

The second element in the definition of the process is a definition of an abstract model of the process. FIG. 4 shows an example of an abstract model of a process, which could be defined using the system of FIG. 1. The process features in the creation of a document, for example, the document 7 of FIG. 2.

An abstract process model, such as that of FIG. 4, includes actions 28–32 and states 33–36. An object type is associated with each of the actions 28–32. When the action is performed on an object of this type, one or more of its attributes are changed. The object thus moves from one state to another. The states 33–36 allow effective monitoring of the process. By inspecting an object's state, it is possible to determine whether certain actions have been performed on it.

The abstract process model further comprises exactly one initial state 37 and at least one final state 38. There can be several final states in an abstract process model, but only one initial state, since an object must be clearly defined at the start of the process.

In a preferred embodiment, there are two kinds of actions. The first kind of action results in a predefined modification of one or more attributes of the object on which the action is performed. This kind of action modifies the information content of an object. In FIG. 4, two actions of the first kind are present, and they are a writing action 28 and an editing action 29. These actions 28 and 29 result in exactly one predefined state. The writing action 28 results in an object in a 'draft' state 33, as does the editing action 29. Of course, these actions 28 and 29 can result in one of any number of possible modifications of the object's information content.

The second kind of action results in one of a number of possible modifications to one or more attributes of an object on which the action is performed. As a result of these actions, the state of an object can change to one of a number of possible states. Three examples of such actions of the second kind are provided in FIG. 4 and they are a reviewing action 30, a checking action 31 and an analysis action 32. The reviewing action 30 moves an object from the 'draft' state 33 to a 'beta' state 34, or to a 'rejected-1' state 35. The checking action 31 changes an object from the 'beta' state 34 to a 'rejected-2' state 36, or to the final state 38, depending on whether the information content of the object contains errors. The analysis action 32 changes the state of an object from the 'rejected-2' state 36 to either the 'beta' state 34 or the 'rejected-1' state 35. If the analysis action 32 has determined that the object is in need of further editing, the 'rejected-1' state 35 will be the outcome. If the object needs to be checked again, the 'beta' state 34 will be the result. In other words, this kind of action has a discrete number of possible outcomes, with corresponding states.

Actions also have an associated object type. For example, the writing action 28 could have the object type 'section' associated with it. The association of object types to actions makes concurrency possible when the actions are performed on real objects. The writing action 28 could be performed on section one 11 of chapter one 8 and on section two 12 of chapter one 8 at the same time, providing that there are sufficient resources. Meanwhile, the editing action 29 could be performed on section three 13 of chapter one 8. If the type 'chapter' were associated with the writing action 28, then this would not be possible since two actions cannot be performed on the same object simultaneously. It is not possible to perform the writing action 28 and the editing action 29 on chapter one 8 simultaneously, because this would lead to conflicts or different versions of the information content.

Actions have roles associated with them. The roles represent the resources needed to perform the action on an object. The system according to the invention also makes action-object combinations available to the actors. The roles associated with the actions are the means that enable it to do so effectively.

The states 33–36 can be used as checkpoints, for when the process is performed on an actual object. An object will pass between two consecutive actions, when it is in the appropriate state, as defined by the values of its attributes.

In a preferred embodiment of the invention, the present system is capable of optimizing the abstract model of the process in order to maximize the number of actions that are performed in parallel. To do this, the system rearranges the connections between tasks in order to create as many parallel branches in the process model as possible. The method used to optimize the abstract model of the process is described in more detail in a co-pending U.S. patent application Ser. No. 10/197864 (based on European Patent Appln. No. 01202762.9 filed Jul. 19, 2001) filed Jul. 19, 2002, entitled "Method for creating an optimal workflow" and owned by the same assignee, the entire contents of which are herein fully incorporated by reference.

Figure 5:
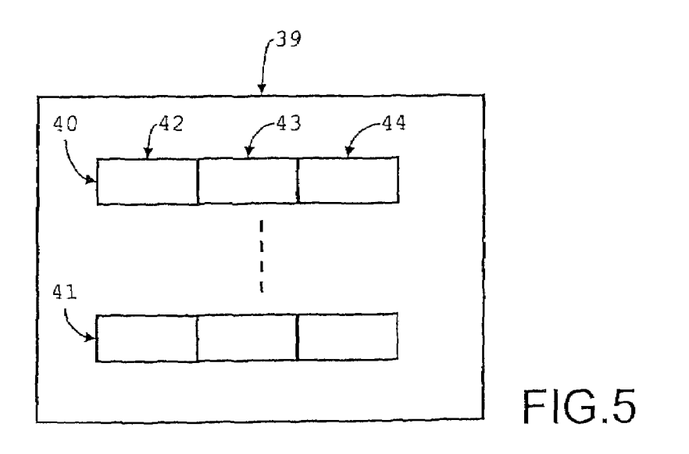

The system according to the present invention defines and stores the abstract model of the process in an abstract process model database 39, schematically represented in FIG. 5 as an example. The database 39 comprises records 40 and 41 for each action. Each of the records 40 and 41 comprises an action definition field 42, an object type field 43 and a role field 44. The action definition field 42 defines the action. The action definition field 42 can contain an identifier for the action, i.e., its name, details on how it modifies an object's attributes, and a pointer to software involved in the action. The object type field 43 defines the type of object that the action can be associated with. The role field 44 determines to whom the action can be assigned.

The third element in the definition of the process according to the present invention comprises the actors. They are the resources, human or otherwise, for carrying out actions on objects. In the system of FIG. 1, the main actors are human, but in a different process, for example, the assembly of a product or a process in a computer system, the actors can be machine components, methods in a computer program, or a combination thereof.

Actors are characterized by roles, which correspond to the roles that are associated with actions in the abstract model of the process, described above. The present system only makes action-object combinations available to actors with the appropriate role.

The (human) actors, who make use of the system of FIG. 1, can for instance have the roles 'writer', 'analyst', or 'supervisor'. 'Writer' would then be the role associated with the writing action 28, and 'supervisor' would be the role associated with the checking action 31. Software methods can also be actors in the creation of a document 7, for example, taking care of the lay-out of pages. An actor can have more than one role, and several actors can have the same role.

The functioning of the system according to the present invention will now be explained in more detail with reference to the flow chart depicted in FIG. 6. The flow chart contains some of the more important phases that occur in the use of the system according to the invention.

The first three phases 45–47 comprise the definition of the process. They have already been explained above. During these phases 45–47, the system requires input from the user. It is worth pointing out that the object definition phase 45 need not comprise a complete and definitive definition of the entire structure of objects. A definition of the type structure, wherein one instance of each object type is defined, would suffice. It is important that all the types and attributes be defined with their appropriate values, in order that an actor definition phase 46 and an abstract process model definition phase 47 can be completed.

As explained, the preferred embodiment of the system according to the invention comprises an optional abstract process model optimization phase 48. If the instances of each object type have not all been defined in the object definition phase 45, then the system will go through a definitive object definition phase 49.

A specific process model can be created next in an object-action assignment phase 50. The system comprises means for automatically establishing a link between objects and actions, according to whether the associated object types match.

The system according to an embodiment comprises a third database, not shown separately, to define and store the specific process model. It is created in this phase by making copies of the records 40 and 41 in the abstract process model database 39 for each instance of an object of the type defined in the object type field 43. Extra fields can be added to the records during creation, for example, for storing actors' comments. Each record in the resultant database stores the details of one object-action combination. The third database is thus very similar to the abstract process model database 39 in that the records are structured in the same way, but it is larger in size.

The object-centered approach at the basis of the system according to the invention gives it certain advantages not shown in the prior art. Each object is separately linked to an action, through its own copy of the records 40 and 41 in the third database. When a series of consecutive actions is defined in the abstract process model for a certain object type, independent series of action-object combinations will be made in the system. Because these series are independent of one another, the objects on which the actions operate can be in different states at any one time. This leads to a more efficient use of resources, especially if there are few actors with the appropriate role for one of the actions. Bottlenecks during execution are prevented.

In a preferred embodiment, the system also comprises means for optimizing the specific object process model created in the object-action assignment phase 50. These means make use of further features of the method for optimizing a workflow that is described in the co-pending U.S. Patent Application mentioned above. The resulting specific object process model is optimized to enable as many object-action combinations to be executed in parallel as is possible.

Figure 6:
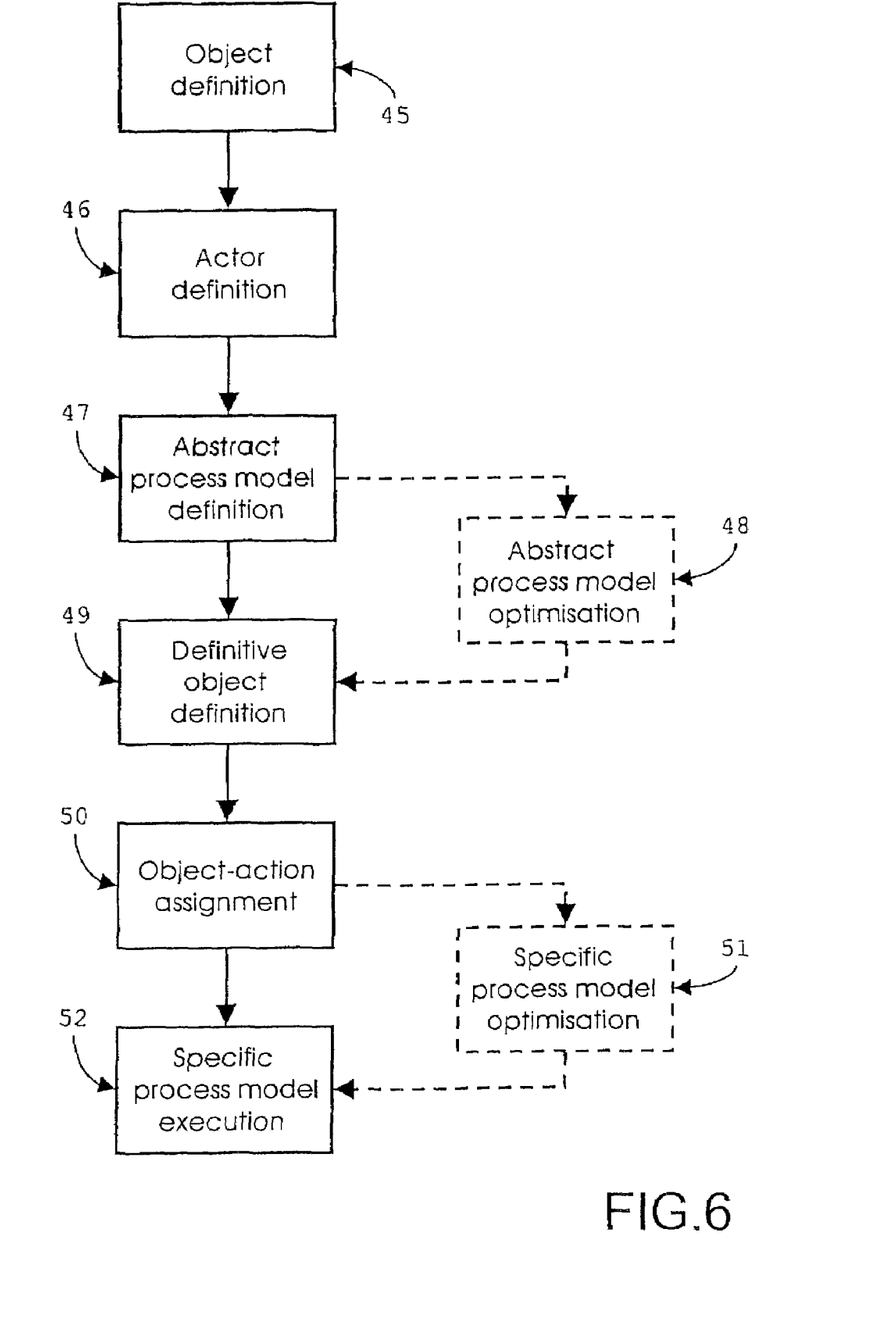

The system then moves into a specific object process execution phase 52, the last phase in FIG. 6, wherein executable action-object combinations are made available to actors with the appropriate role. The system first assigns action-object combinations to actors or presents actors with a list of action-object combinations from which they can elect to execute one. This aspect of the system can have various features within the spirit of the invention. For example, a feature that allows actors to lay a claim on future action-object combinations is conceivable. A further feature that allows actors to return, refuse or pass on to another actor a received or claimed action-object combination is also possible. The system of FIG. 1 could comprise a warning mechanism to alert actors to urgent action-object combinations that have not yet been started upon. A similar mechanism could alert actors if one action threatens to hold up the entire process.

After the execution phase 52, the present system updates the stored models and attributes. It then presents new action-object combinations, of which the execution has now become possible, to actors, or assigns them automatically.

When making action-object combinations available, the present system takes account of the roles of the actors. Only actors with the appropriate role are presented with a list of executable action-object combinations on the monitor 6 of their computer 2–4, for example. When a software method is the appropriate actor, the action-object combination can be executed automatically on the server 1 or one of the computers 24, without human involvement.

It is also possible to define additional rules for making action-object combinations available to actors. For example, a rule can be defined to prevent the reviewing of chapter one 8 by the actors who wrote the sections 11–13 of that chapter.

The present system only makes action-object combinations available, when the object concerned is in the appropriate state leading to the task in the process model. The object will only pass to the action if its attributes have the appropriate values. The present system also performs a check of the objects that directly descend from the object concerned or from which it is directly descended. Two objects that lie on a direct line from the object at the top of the hierarchical tree structure of constituent objects to an object in the lowest layer of the hierarchy cannot simultaneously be involved in separate actions. This is a consequence of the fact that the attributes of child and parent can affect each other. Ambiguity might otherwise arise.

As an example, different actions on section one 11 of chapter one 8 and on chapter one 8 cannot be performed simultaneously, because these objects 8 and 11 lie on a direct line 53 from the document 7 to section one 11 of chapter one 11 in the object model of FIG. 2. It is clear that chapter one 8 cannot meaningfully go through the reviewing action 30, when the writing action 28 is simultaneously being performed on section one 11 of chapter one 8.

When an actor starts execution of an action-object combination, the system blocks performance of actions on parent or child objects, by removing the action-object combinations involving these objects from the lists presented to the actors.

After the action has been performed on the object, values of attributes are changed, so that it will be in the appropriate state for starting a next action. In addition, the system automatically updates relevant attributes of parent and child objects, and changes their states. For example, when all the sections 11–13 of chapter one 8 have been written, the state of chapter one 8 will also change to 'draft'. Chapter one 8 can then pass to the reviewing action 30, if this action 30 has the type 'chapter' associated with it. Thus a change in the attributes of all child and parent objects of an object is automatically effected, when an attribute of the object affecting the attributes of the child and parent objects is changed in an action performed on that object. There is a propagation of attribute changes through the hierarchical multi-layered tree structure.

It is also feasible to allow actors to add comments to the attributes of the object, for example, to draw the attention of other actors to an aspect. This would be especially useful at the end of a reviewing action, if parts of the document 7 need to be rewritten. In addition, the present system could allow the existence of several versions of an object. It might be useful to keep copies of older versions of the document 7, for instance. The system can then comprise a mechanism for ensuring that no one inadvertently starts work on an outdated version of an object.

A further optional feature of the system can be a timekeeping system, to automatically record how much time was taken to complete an action on an object. This information could be used to distribute future similar action-object combinations more efficiently, to assess the performance of the actors, or to gain an accurate idea of the cost of different actions. Other records of used resources, financial or otherwise, could also be kept by the system according to the invention.

The invention is not limited to the above-described embodiments, which can be varied in a number of ways within the scope of the claims. For example, the system need not necessarily take the shape of a network of computers, but could instead consist of only one computer, possibly an embedded processor in a device. Also, the order of definition of actors, object and abstract process model can be slightly varied or the phases of the method can occur simultaneously.

The invention claimed is:

1. A system for controlling and monitoring a process performed by one or more actors defined by roles, wherein the process is associated with a complex object in which constituent objects can be distinguished, and wherein the system comprises:

means for defining and storing a model of the complex object;

means for defining and storing an abstract model of the process, wherein the process includes actions;

means for creating action-object combinations;

means for linking roles to actions;

means for establishing whether an action-object combination is ready to be executed; and means for making executable action-object combinations available to the actors with an appropriate role, wherein the complex object is modeled in a hierarchical multi-layered tree structure of constituent objects in which parent objects have children in a lower layer.

2. The system according to claim 1, wherein the complex object and its constituent objects have attributes, and the system further comprises means for automatically changing the attributes of all child and parent objects of an object, when an attribute of the object affecting the attributes of the child and parent objects is changed in an action performed on the object.

3. The system according to claim 1, wherein the complex object and its constituent objects have an object type, and the means for defining the abstract model of the process comprises means for associating an object type with an action.

4. The system according to claim 3, wherein the means for creating the action-object combinations automatically establishes a link between the complex object or one of its constituent objects, and an action, according to the type of the object.

5. The system according to claim 1, wherein the means for establishing whether the action-object combination is ready to be executed, checks whether no actions are currently being performed on the object or any object from which it is descended or that descends from it.

6. The system according to claim 1, wherein the means for establishing whether the action-object combination is ready to be executed, checks whether values for attributes of the object are all appropriate to the action.

7. The system according to claim 1, wherein the process comprises actions that result in a pre-defined modification of one or more attributes of the object on which the action is performed.

8. The system according to claim 1, wherein the process comprises actions that result in one of a number of possible modifications to one or more attributes of the object on which the action is performed.

9. A programmable processing device comprising one or more of the components of the system of claim 1.

10. A method for controlling and monitoring a process performed by one or more actors defined by roles, wherein the process is associated with a complex object in which constituent objects can be distinguished, and wherein the method comprises:

defining and storing a model of the complex object;

defining and storing an abstract model of the process, wherein the process includes actions;

creating action-object combinations;

linking roles to actions;

establishing whether an action-object combination is ready to be executed; and making executable action-object combinations available to the actors with an appropriate role, wherein the complex object is modeled in a hierarchical multi-layered tree structure of constituent objects in which parent objects have children in a lower layer.

11. The method according to claim 10, wherein the complex object and its constituent objects have attributes, and the method further comprises automatically changing the attributes of all child and parent objects of an object, when an attribute of the object affecting the attributes of the child and parent objects is changed in an action performed on the object.

12. The method according to claim 10, wherein the complex object and its constituent objects have an object type, and the step of defining the abstract model of the process comprises the step of associating an object type with an action.

13. The method according to claim 12, wherein the step of creating the action-object combinations automatically establishes a link between the complex object or one of its constituent objects, and an action, according to the type of the object.

14. The method according to claim 10, wherein the step of establishing whether the action-object combination is ready to be executed, checks whether no actions are currently being performed on the object or any object from which it is descended or that descends from it.

15. The method according to claim 10, wherein the step of establishing whether the action-object combination is ready to be executed, checks whether values for attributes of the object are all appropriate to the action.

16. The method according to claim 10, wherein the process comprises actions that result in a pre-defined modification of one or more attributes of the object on which the action is performed.

17. The method according to claim 10, wherein the process comprises actions that result in one of a number of possible modifications to one or more attributes of the object on which the action is performed.

18. A computer program product embodied on a computer-readable medium, for controlling and monitoring a process performed by one or more actors defined by roles, wherein the process is associated with a complex object in which constituent objects can be distinguished, and wherein the computer program product comprises computer-executable instructions for:

defining and storing a model of the complex object;

defining and storing an abstract model of the process, wherein the process includes actions;

creating action-object combinations;

linking roles to actions;

establishing whether an action-object combination is ready to be executed; and making executable action-object combinations available to the actors with an appropriate role, wherein the complex object is modeled in a hierarchical multi-layered tree structure of constituent objects in which parent objects have children in a lower layer.

19. The computer program product according to claim 18, wherein the complex object and its constituent objects have attributes, and the computer program product further comprises computer-executable instructions for automatically changing the attributes of all child and parent objects of an object, when an attribute of the object affecting the attributes of the child and parent objects is changed in an action performed on the object.

20. The computer program product according to claim 18, wherein the complex object and its constituent objects have an object type, and the computer-executable instructions for defining the abstract model of the process comprise computer-executable instructions for associating an object type with an action.

21. The computer program product according to claim 20, wherein the computer-executable instructions for creating the action-object combinations automatically establish a link between the complex object or one of its constituent objects, and an action, according to the type of the object.

22. The computer program product according to claim 18, wherein the computer-executable instructions for establishing whether the action-object combination is ready to be executed, check whether no actions are currently being performed on the object or any object from which it is descended or that descends from it.

23. The computer program product according to claim 18, wherein the computer-executable instructions for establishing whether the action-object combination is ready to be executed, check whether values for attributes of the object are all appropriate to the action.

24. The computer program product according to claim 18, wherein the process comprises actions that result in a pre-defined modification of one or more attributes of the object on which the action is performed.

25. The computer program product according to claim 18, wherein the process comprises actions that result in one of a number of possible modifications to one or more attributes of the object on which the action is performed.

26. The system according to claim 1, wherein the one or more actors are one or more users of the system.

27. The method according to claim 10, wherein the one or more actors are one or more users.

28. The computer program product according to claim 18, wherein the one or more actors are one or more users.

* * * * *